United States Patent [19]

Nishimura et al.

[11] 4,266,375
[45] May 12, 1981

[54] FEED CONTROL APPARATUS FOR A MACHINE TOOL CARRIAGE

[75] Inventors: Hideo Nishimura, Aichi; Yasufumi Tokura, Toyota; Kunihiko Unno, Kariya; Minoru Enomoto; Isamu Yokoe, both of Ohbu; Norihiko Shimizu, Nagoya; Haruo Ohmura, Okazaki, all of Japan

[73] Assignee: Toyoda-Koki Kabushiki-Kaisha, Kariya, Japan

[21] Appl. No.: 128,154

[22] Filed: Mar. 7, 1980

[30] Foreign Application Priority Data

Mar. 28, 1979 [JP] Japan .................................. 54-36394

[51] Int. Cl.³ ............................................. B24B 49/00
[52] U.S. Cl. .............................. 51/165.71; 51/165.77; 318/571
[58] Field of Search ........... 51/165 R, 165.71, 165.77; 318/565, 571

[56] References Cited

U.S. PATENT DOCUMENTS

| | | | |
|---|---|---|---|
| 3,576,979 | 5/1971 | McCall | 318/565 |
| 3,934,185 | 1/1976 | Schoonover | 318/565 |
| 3,996,454 | 12/1976 | Froyd | 318/565 |
| 4,115,958 | 9/1978 | Englander | 51/165.71 X |
| 4,160,937 | 7/1979 | Fiorini | 318/571 |

*Primary Examiner*—Harold D. Whitehead
*Attorney, Agent, or Firm*—Oblon, Fisher, Spivak, McClelland & Maier

[57] ABSTRACT

A feed control apparatus wherein a servomotor control device responsive to feed pulses distributed from a numerical controller controls a d.c. servomotor to advance a grinding wheel carriage of a grinding machine through the rotation of a feed screw successsively at a speed-up feed rate, a rapid feed rate, a slow-down feed rate and a grinding feed rate. A detection device is provided, which outputs a velocity checking signal to an abnormality confirmation device when the carriage reaches a velocity checking point defined within a slow-down feed range. When confirming that the feed rate of the carriage has exceeded a reference feed rate lower than the rapid feed rate, the abnormality confirmation device applies a stop signal to an emergency stop control circuit in response to the velocity checking signal, so that the rotation of the servomotor is immediately discontinued.

7 Claims, 5 Drawing Figures

FEED CONTROL APPARATUS FOR A MACHINE TOOL CARRIAGE

BACKGROUND OF THE INVENTION

1. Field of the Invention

The present invention relates to a feed control apparatus for controlling rapid and machining feed movements of a tool or workpiece carriage by changing the rotational speed of a servomotor drivingly connected to the carriage. Particularly, the invention relates to such a feed control apparatus suitable for use in grinding machines.

2. Description of the Prior Art

In a grinding machine as disclosed in U.S. Pat. No. 4,115,958 to G. E. Englander et al., a carriage rotatably supporting a grinding wheel is moved by a single servomotor at a rapid non-grinding feed rate until a point just ahead of a programmed fast feed end point is reached and then at a slow grinding feed rate until a workpiece is finished to a predetermined size. If rapid feed movement of the carriage is continued beyond the programmed fast feed end point due to malfunction of the circuit which controls rotation of the servomotor, the grinding wheel could be brought into engagement with the workpiece at the rapid feed rate, and this results in breakage of the grinding wheel, fault of the workpiece, and the like.

In order to prevent the grinding wheel from engaging the workpiece at the rapid feed rate, measures have been taken in the grinding machine to shut down the same in response to a signal from a sensor in the event that the current required by a motor to rotate the grinding wheel exceeds a predetermined relatively low idle current during rapid feed movement. However, since it is after engagement of the grinding wheel with the workpiece that the measures begin their functions to shut down the grinding machine, there is no substantial time until the grinding wheel begins to be broken. It is therefore technically difficult to use such measures in the case where the rapid feed rate of the grinding wheel is so high as to reach 5 m/sec.

SUMMARY OF THE INVENTION

It is, therefore, a primary object of the present invention to provide an improved feed control apparatus for a machine tool carriage wherein an emergency stop of a servomotor is effected if it is confirmed that when the carriage reaches a velocity checking point defined within a slow-down feed range, the feed rate of the carriage has not been reduced below a predetermined reference feed rate.

Another object of the present invention is to provide an improved feed control apparatus of the character set forth above wherein a velocity checking point, where it is confirmed whether the feed rate of a carriage supporting a grinding wheel is slowed down below a predetermined reference feed rate, is shiftable in connection with a dressing operation of the grinding wheel.

A further object of the present invention is to provide an improved feed control apparatus of the character set forth above in which a velocity checking point, where it is confirmed whether the feed rate of a carriage supporting a tool or a workpiece is slowed down below a predetermined reference feed rate, is shiftable in connection with the alteration of a rapid feed stroke of the carriage.

Briefly, these objects are achieved by the present invention through the provision of a feed control apparatus for a machine tool carriage, which comprises a numerical controller responsive to numerical control information for outputting feed pulses to a servomotor control device selectively at first to third frequencies. The servomotor control device controls a servomotor to displace the carriage through a feed screw selectively at rapid, slow-down and machining feed rates respectively when receiving feed pulse trains of the first to third frequencies. The feed control apparatus further includes a detection device, which emits a velocity checking signal when the carriage reaches a velocity checking point defined within a slow-down feed range. An abnormality confirmation circuit device is further provided, which applies a stop signal to an emergency control circuit in response to the velocity checking signal when confirming that the actual feed rate of the carriage has not yet been reduced below a reference feed rate, which is lower by a predetermined value than the rapid feed rate. The emergency control circuit is responsive to the stop signal to discontinue the rotation of the servomotor, so that the carriage is prevented from being further advanced at the rapid feed rate.

In one preferred form of the present invention, the detection device is constructed by a limit switch, which is disposed to be actuated when the carriage reaches the velocity checking point. More preferably, for application of the present invention to grinding machines, the limit switch is secured to a shiftable member, whose position is compensated by a pulsemotor for a decrease in diameter of a grinding wheel carried on the carriage.

In another preferred form of the present invention, the detection device is composed of a gate, a counter, a digital comparator and a digital switch. During rapid movement of the carriage, the gate passes feed pulses from the numerical controller to the counter. The digital comparator applies the velocity checking signal to the abnormality confirmation circuit device upon coincidence between the content of the counter and preset data of the digital switch which data indicates the velocity checking point. For adaptation to the alteration of the rapid feed stroke of the carriage, still another preferred form of the present invention employs a digital calculator, which receives rapid feed amount data from the numerical controller and two other data from digital switches for calculating data indicative of the velocity checking point. This calculated data ia applied to the digital comparator for comparison with the content of the counter.

In a further preferred form of the present invention, there is used as the detection device a timer, which is set to be timed up when the carriage reaches the velocity checking point.

BRIEF DESCRIPTION OF THE DRAWINGS

The foregoing and other objects, features and attendant advantages of the present invention will readily be appreciated as the same becomes better understood by reference to the following detailed description of the preferred embodiments when considered in connection with the accompanying drawings, in which.

DETAILED DESCRIPTION OF THE PREFERRED EMBODIMENTS

Figure 1:
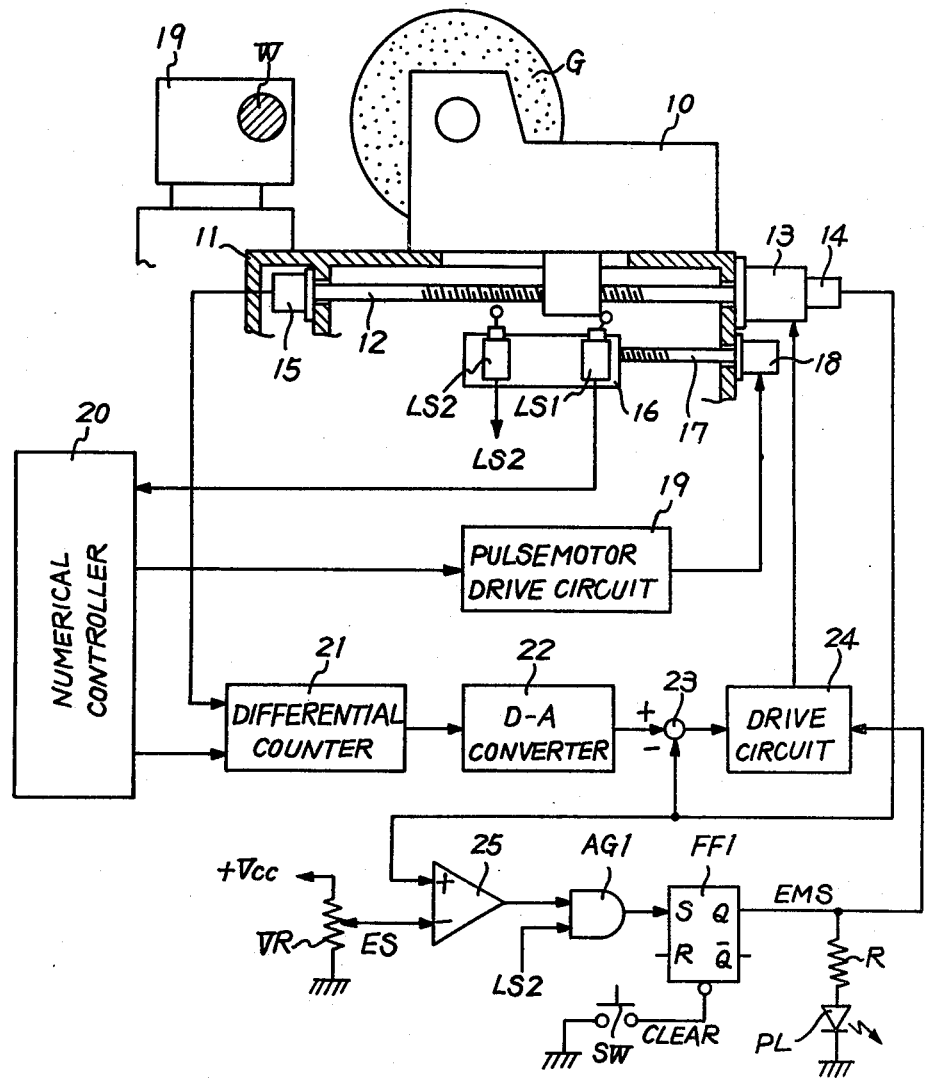
FIG. 1 is a block diagram of a first embodiment of a feed control apparatus according to the present invention.

Referring now to the drawings, wherein like reference numerals designate the same or corresponding parts throughout the several views, and particularly to FIG. 1 thereof, there is illustrated as a first embodiment of the present invention a feed control apparatus for a wheel carriage 10, which supports a grinding wheel G rotatable by a wheel drive motor (not shown). The wheel carriage 10 is so guided on a machine bed 11 that the grinding wheel G is movable in a direction perpendicular to the axis of a cylindrical workpiece W rotatably carried by a workhead 19. The wheel carriage 10 is in threaded engagement with a feed screw 12 rotatable by a d.c. servomotor 13, which is mounted on a rear surface of the bed 11.

The servomotor 13 is provided with a tachogenerator or a velocity detector 14 for detecting the actual feed rate of the wheel carriage 10 from the rotational speed of the servomotor 13. The feed screw 12 is provided at its one end with a pulse generator 15, which is adapted to generate one feed back pulse each time the feed screw 12 rotates a predetermined angular distance. Provided in the bed 11 is a shiftable plate 16, to which first and second limit switches LS1, LS2 are secured. As is apparent from FIG. 2, the first limit switch LS1 is provided for confirming the returning of the wheel carriage 10 to a home position P0, and the second limit switch LS2 is provided for confirming the reaching of the wheel carriage 10 to a velocity checking point Pvc. This checking point Pvc is for confirming whether or not the feed rate of the wheel carriage 10 has been reduced below a reference feed rate VS, which is lower by a predetermined value than a rapid feed rate VF, and is set within a slow-down feed range DS defined between a slow-down feed starting point P1 and a rapid feed end point P2.

The shiftable plate 16 is connected to a pulsemotor 18 through a compensation feed screw 17. The pulsemotor 18 is connected to a pulsemotor drive circuit 19 for receiving therethrough feed pulses from a numerical controller 20. When the grinding wheel G is dressed by a dressing device (not shown), the home position P0 of the wheel carriage 10 is compensated by a dressing infeed depth, simultaneously with which the shiftable plate 16 is advanced by the dressing infeed depth for adjustment of the velocity checking point Pvc. It will be realized accordingly that where the diameters of a number of workpieces to be ground in succession are invariable, the distance of the grinding wheel working surface from the workpiece surface is maintained constant irrespective of a decrease of the grinding wheel diameter, when the wheel carriage 10 is in the home position P0.

A servomotor control device, constituted by a differential counter 21, a digital to analogue converter 22, an operation circuit 23 and a drive circuit 24, serves to displace the wheel carriage 10 in response to feed pulses distributed from the numerical controller 20. The distributed pulses output from the numerical controller 20 at a frequency corresponding to a commanded feed rate are supplied to the differential counter 21, by which calculation is carried out for the difference in number between the distributed pulses and the feed back pulses generated from the pulse generator 15. It is to be noted herein that such calculated difference indicates a value proportional to the frequency of the distributed pulses, namely to the commanded feed rate.

The difference calculated by the differential counter 21 is converted by the digital to analogue converter 22 into a corresponding analogue signal, which is then applied as a velocity command voltage to the operation circuit 23. For velocity feedback control, this operation circuit 23 calculates the difference between the velocity command voltage received from the digital to analogue converter 22 and a velocity feedback voltage received from the velocity detector 14 and supplies the differential voltage to the drive circuit 24. Since the drive circuit 24 is capable of controlling the rotational speed of the servomotor 13 to decrease the differential voltage output from the operation circuit 23 to zero, the servomotor 13 is rotated at a velocity corresponding to the velocity command voltage output from the digital to analogue converter 22, whereby the wheel carriage 10 is displaced at a commanded feed rate.

Figure 2:
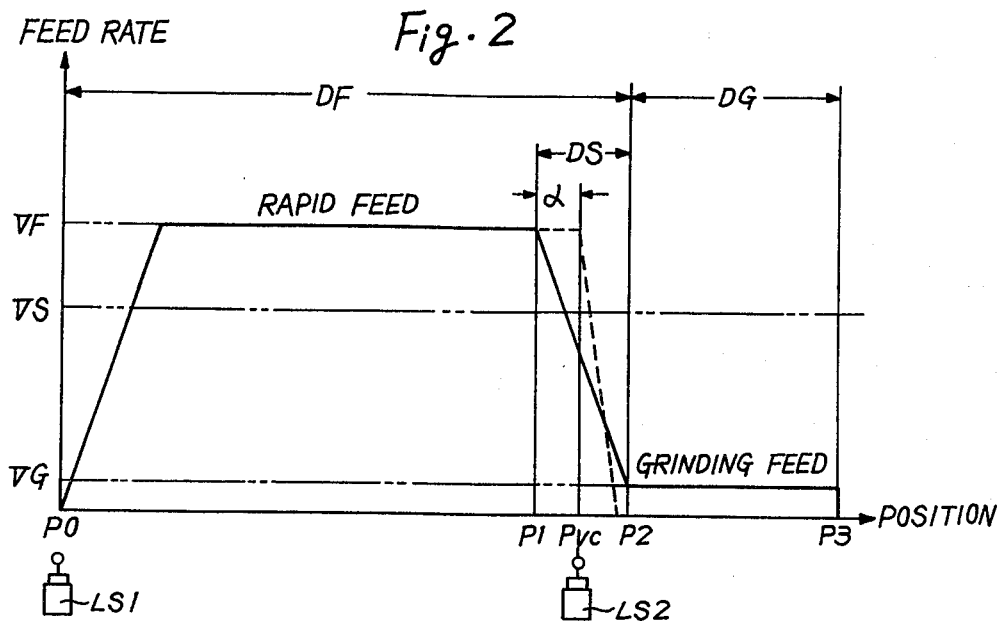
FIG. 2 is a graph showing a change in feed rate of a grinding wheel carriage illustrated in FIG. 1.

The numerical controller 20 is responsive to numerical control information to perform such a pulse distribution operation that the wheel carriage 10 is advanced from the home position P0 by a first programmed distance DF at the rapid feed rate VF and then, is advanced by a second programmed distance DG at a grinding feed rate VG, as shown in FIG. 2. The numerical controller 20 is further adapted to perform speed-up and slow-down feed controls respectively at initial and final parts of rapid feed movement of the wheel carriage 10. It is to be noted herein that the slow-down feed range DS and the velocity checking point Pvc are so chosen that when the emergency stop of the servomotor 13 is effected from the velocity checking point Pvc, as described later, movement of the wheel carriage 10 is discontinued at a point just ahead of the rapid feed end point P2, as indicated by the broken line in FIG. 2.

The feed control apparatus according to the present invention further includes an analogue comparator 25, which compares the velocity feedback voltage received from the velocity detector 14 with a reference voltage ES preset by a variable resistance VR. This reference voltage ES is set to designate the above-noted reference feed rate VS. The comparator 25 is adapted to output a signal while the actual feed rate of the wheel carriage 10 exceeds the reference feed rate VS. The signal from the comparator 25 is applied as an abnormality signal to a set terminal S of a flip-flop FF1 through an AND gate AG1, which is responsive to an actuation signal (velocity checking signal) of the second limit switch LS2. The flip-flop FF1 is for memorizing the occurrence of abnormality and will be set if the actual feed rate of the wheel carriage 10 exceeds the reference feed rate VS when the reaching of the wheel carriage 10 to the velocity checking point Pvc causes the second limit switch LS2 to be closed.

The flip-flop FF1, when set, outputs a set signal from its set output terminal Q. This signal is applied as an emergency stop signal EMS to the drive circuit 24, which thus discontinues the rotation of the servomotor 13 in the manner of, for example, dynamic braking. The signal from the flip-flop FF1 is further used to turn on an abnormality indication lamp PL, thereby informing an operator of the occurrence of abnormality. The servomotor 13 rotates a short distance of angle for its inertia even after being subjected to braking as a result of application of the emergency stop signal EMS to the drive circuit 24. However, since the position of the second limit switch LS2 is beforehand set to ensure that the displacement of the wheel carriage 10 for inertia is discontinued at a point just ahead of the rapid feed end point P2 as indicated by the broken line in FIG. 2, in other words, that it is discontinued before engagement between the grinding wheel G and the workpiece W, it can be prevented that breakage of the grinding wheel G and fault of the workpiece W and machine parts result from engagement of the grinding wheel G with the workpiece W at the rapid feed rate or any slower but dangerous feed rate.

Figure 3:
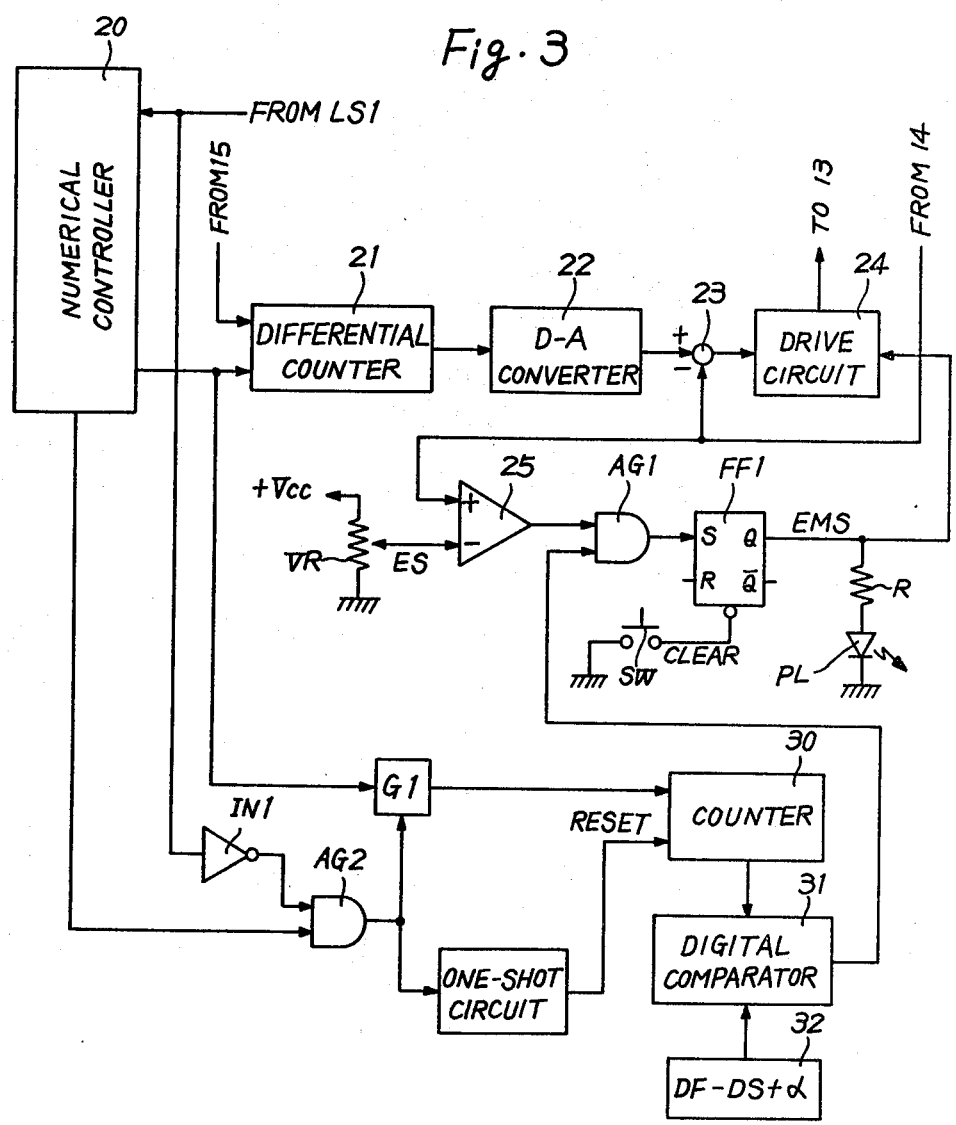

FIG. 3 shows a second embodiment of the present invention, wherein the passing of the wheel carriage 10 through the velocity checking point Pvc is detected by counting the distribution pulses output from the numerical controller 20. In this embodiment, there is provided a counter 30, which counts the number of the distribution pulses received from the numerical controller 20 through a gate G1. The counted value of the counter 30 is applied to a digital comparator 31 for comparison with a preset value set in a digital switch 32. The digital comparator 31 emits a coincidence signal as the velocity checking signal to open the above-noted AND gate AG1 upon coincidence between the outputs from the counter 30 and the digital switch 32. The digital switch 32 is preset with a value which corresponds to the distance $DF-DS+\alpha$ between the wheel carriage home point P0 and the velocity checking point Pvc, where the symbols DF, DS and $\alpha$ respectively represent a rapid feed amount, a slow-down feed amount and the distance between the slow-down feed starting point P1 and the velocity checking point Pvc.

The gate G1 is opened in response to an output signal from another AND gate AG2. This AND gate AG2 is connected to receive an actuation signal of the first limit switch LS1 through an inverter IN1 and also to receive from the numerical controller 20 a signal indicative of a direction in which the wheel carriage 10 is to be advanced. Such a direction indication signal is easily taken out by connecting the AND gate AG2 to a flag element (not shown) such as a flip-flop, which is provided in the numerical controller 20 to store such a direction indication signal. The gate G1 is kept opened while the wheel carriage 10 is being advanced toward the workpiece W. Accordingly, when feed pulses of the number corresponding to the distance $DF-DS+\alpha$ are distributed from the numerical controller 20 with the result of the wheel carriage 10 reaching the velocity checking point Pvc, a coincidence signal is output from the digital comparator 31 to thereby open the AND gate AG1. It can therefore be checked in a manner similar to that in the first embodiment, whether the feed rate of the wheel carriage 10 has been reduced below the reference feed rate VS or not.

It may otherwise be possible to detect the reaching of the wheel carriage 10 to the velocity checking point Pvc by counting the number of the distribution pulses from the time when the slow-down feed is initiated, namely by causing the gate G1 to open from such time. In this case, a value corresponding to the distance $\alpha$ is preset in the digital switch 32.

Figure 4:
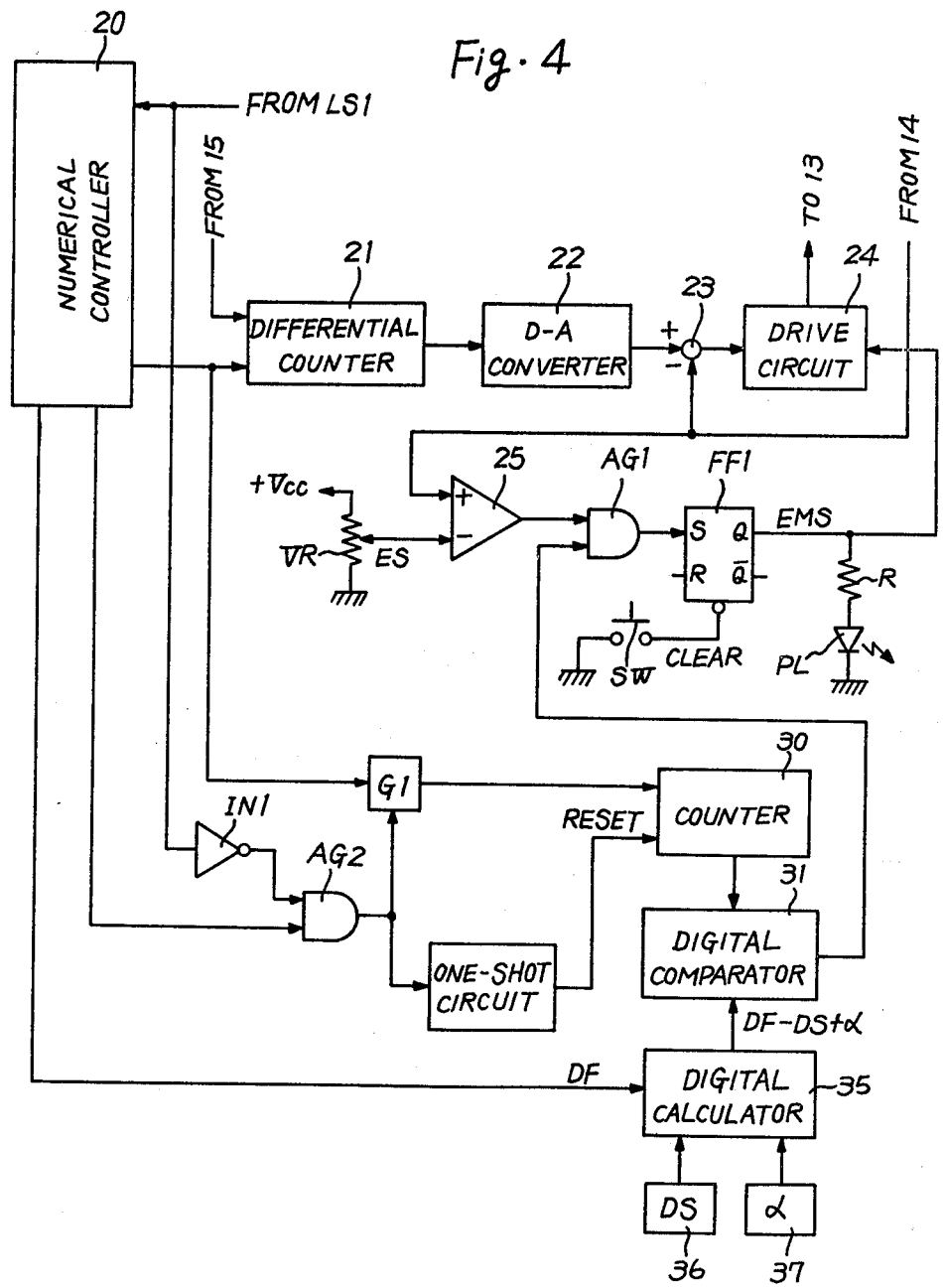

In the case where the diameters of a number of workpieces W to be ground in succession are variable, various rapid feed amounts DF are programmed in numerical control information in correspondence respectively to the workpieces W. It is therefore necessary to change the distance $DF-DS+\alpha$ between the wheel carriage home position P0 and the velocity checking point Pvc in connection with each workpiece W to be next ground. To this end, in a third embodiment as shown in FIG. 4, there are employed a digital calculator 35 and digital switches 36, 37 in place of the digital switch 32 of the above-described second embodiment. The digital calculator 35 is responsive to the rapid feed amount DF received as variable from the numerical controller 20 as well as to the above-noted values DS and $\alpha$ received as fixed data from the digital switches 36, 37 so as to thereby perform the calculation of $DF-DS+\alpha$. The value obtained by such calculation is applied to the digital comparator 31 and is compared therein with the output from the counter 30 for controlling the AND gate AG1. Consequently, in the third embodiment, it is possible to automatically set a velocity checking point Pvc which is appropriate to the diameter of a workpiece W to be ground. Furthermore, position feedback pulses generated by the pulse generator 15 may be applied to the counter 30 through the gate G1 in lieu of feed pulses distributed from the numerical controller 20.

Figure 5:
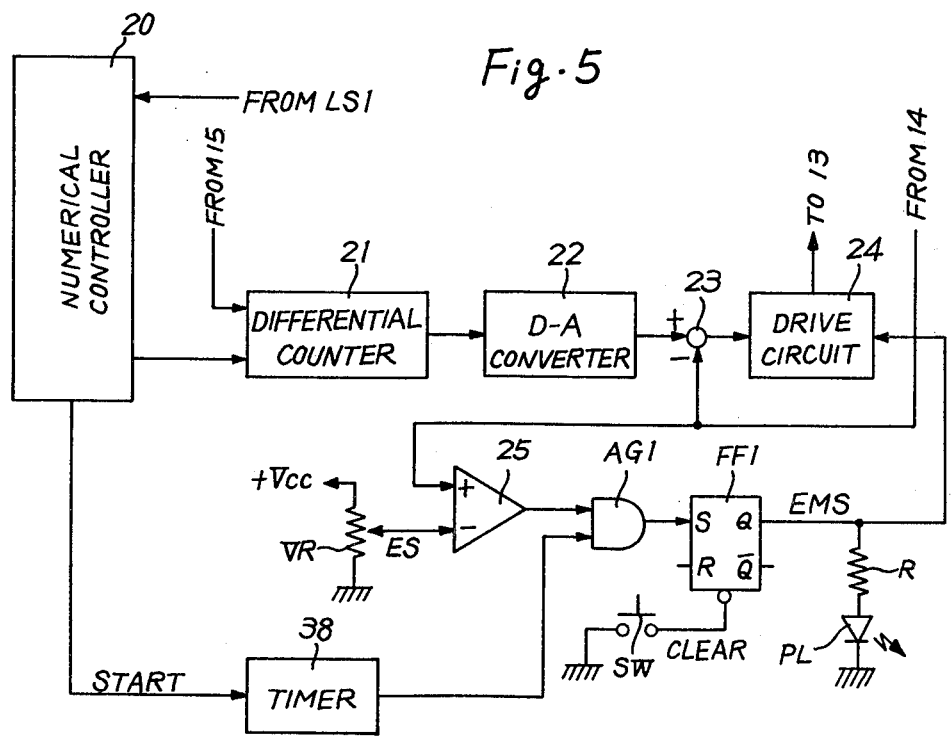
FIGS. 3 to 5 are, respectively, block diagrams of second to fourth embodiments of a feed control apparatus according to the present invention.

FIG. 5 illustrates a fourth embodiment of the present invention, wherein the velocity checking point Pvc is set in terms of time. There is provided a timer 38, which is energized when the wheel carriage 10 leaves the home position P0 and which is timed up after the expiration of a preselected period of time. The signal the timer 38 emits upon time-up is used to indicate that the wheel carriage 10 has reached the velocity checking point Pvc and is applied to the AND gate AG1 to thereby open the same. When the wheel carriage rapid feed amount DF is changed, a preset value of the timer 33 is adjusted so that the shifting of the velocity checking point Pvc to a point appropriate to the changed rapid feed amount DF is possible. In a certain case, the energization of the timer 38 may be effected when a wheel carriage 10 reaches a point selected between the points P0 and P1.

Although the feed rate detection in the above-described particular embodiments is practiced by inputting to the analogue comparator 25 the signal from the velocity detector 14 which feedbacks the rotational speed of the servomotor 13 to the operation circuit 23, such feed rate detection may otherwise be possible by providing an additional velocity detector which directly detects the feed rate of the wheel carriage 10. Instead of the signal from the velocity detector 14, the signal from the digital to analogue converter 22 may be applied to the analogue comparator 25 or where the same is replaced by a digital comparator, the output from the differential counter 21 may be applied to the digital comparator.

Obviously, numerous modifications and variations of the present invention are possible in light of the above teachings. It is therefore to be understood that within the scope of the appended claims, the invention may be practiced otherwise than as specifically described herein.

What is claimed is:

1. A feed control apparatus for a carriage which is drivingly connected to a servomotor through a feed screw for slide movement on a guide base of a machine tool, comprising:

a numerical controller responsive to numerical control information for outputting feed pulses sselectively at a first frequency for rapid feed, a second frequency for slow-down feed and a third frequency for machining feed;

servomotor control means connected to said numerical controller and said servomotor for controlling rotation of said servomotor in response to said feed pulses output from said numerical controller;

detection means for detecting whether or not said carriage has reached a velocity checking point defined within a slow-down feed range of said carriage, so as to emit a velocity checking signal when the reaching of said carriage to said velocity checking point is detected;

abnormality confirmation circuit means capable of confirming whether or not the actual feed rate of said carriage has been reduced below a reference feed rate, which is lower by a predetermined value than a rapid feed rate, and responsive to said velocity checking signal for outputting an abnormality signal when it is confirmed that the actual feed rate of said carriage still exceeds said reference feed rate; and emergency stop circuit means connected to said servomotor control means and said abnormality confirmation circuit means and responsive to said abnormality signal for causing said servomotor control means to immediately discontinue rotation of said servomotor.

2. A feed control apparatus as set forth in claim 1, wherein said detection means comprises a limit switch disposed to be actuated when said carriage reaches said velocity checking point and connected to said abnormality confirmation circuit means for applying thereto said velocity checking signal when actuated.

3. A feed control apparatus as set forth in claim 2, wherein said numerical controller is adapted to output feed pulses of the number corresponding to a dressing infeed amount, further comprising:

a limit switch support member fixedly supporting said limit switch and shiftable in a direction parallel to sliding movement of said carriage;

a compensation feed screw threadedly engaged with said limit switch support member and rotatable for shifting the position of said limit switch support member;

a motor drivingly connected to said compensation feed screw; and a motor drive circuit connected to said numerical controller and said motor and responsive to said feed pulses of the number corresponding to said dressing infeed amount for rotating said motor, whereby the position of said limit switch is compensated for a decrease in diameter of a grinding wheel carried on said carriage.

4. A feed control apparatus as set forth in claim 1, wherein said detection means comprises:

a counter for counting feed pulses applied thereto;

a gate circuit connected between said numerical controller and said counter and opened at least until said carriage reaches a rapid feed end point, for applying also to said counter said feed pulses applied from said numerical controller to said servomotor control means;

a digital setting switch presettable with a digital value indicative of said velocity checking point; and a digital comparator connected to said counter and said digital setting switch for comparing the content of said counter with said digital value so as to output said velocity checking signal to said abnormality confirmation circuit means upon coincidence therebetween.

5. A feed control apparatus as set forth in claim 1, wherein said detection means includes:

a counter for counting feed pulses applied thereto;

a gate circuit connected between said numerical controller and said counter and opened at least until said carriage reaches a rapid feed end point, for applying also to said counter said feed pulses applied from said numerical controller to said servomotor control means;

a first digital switch presettable with first digital data indicative of the distance between a slow-down feed starting point and said rapid feed end point;

a second digital switch presettable with second digital data indicative of the distance between said slow-down feed starting point and said velocity checking point;

a digital calculator connected to said numerical controller and said first and second digital switches for calculating said digital value indicative of said velocity checking point from a rapid feed distance supplied from said numerical controller and said first and second digital data; and a digital comparator connected to said counter and said digital calculator for comparing the content of said counter with said digital value indicative of said velocity checking point so as to output said velocity checking signal to said abnormality confirmation circuit means upon coincidence therebetween.

6. A feed control apparatus as set forth in claim 1, wherein said detection means includes a timer energized when said carriage leaves a fixed point defined between a home position and a slow-down feed starting point and timed up after expiration of a preselected period of time so as to apply said velocity checking signal to said abnormality confirmation circuit means.

7. A feed control apparatus as set forth in claim 3, 4, 5 or 6, wherein said abnormality confirmation circuit means includes:

a velocity detector drivingly connected to said servomotor for detecting the actual feed rate of said carriage;

a setting circuit for setting said reference feed rate;

an analogue comparator connected to said velocity detector and said setting circuit for comparing the actual feed rate of said carriage with said reference feed rate so as to output a signal while the actual feed rate of said carriage exceeds said reference feed rate; and an AND gate connected to said emergency stop circuit means for applying thereto said abnormality signal when opened in response to said signal from said analogue comparator and said velocity checking signal.

* * * * *